Aug. 31, 1965 C. G. ROPER 3,204,184
FLAT ECCENTRICALLY PIVOTED COIL TYPE METER
MOVEMENT AND HOUSING THEREFOR
Filed July 6, 1961 2 Sheets-Sheet 1
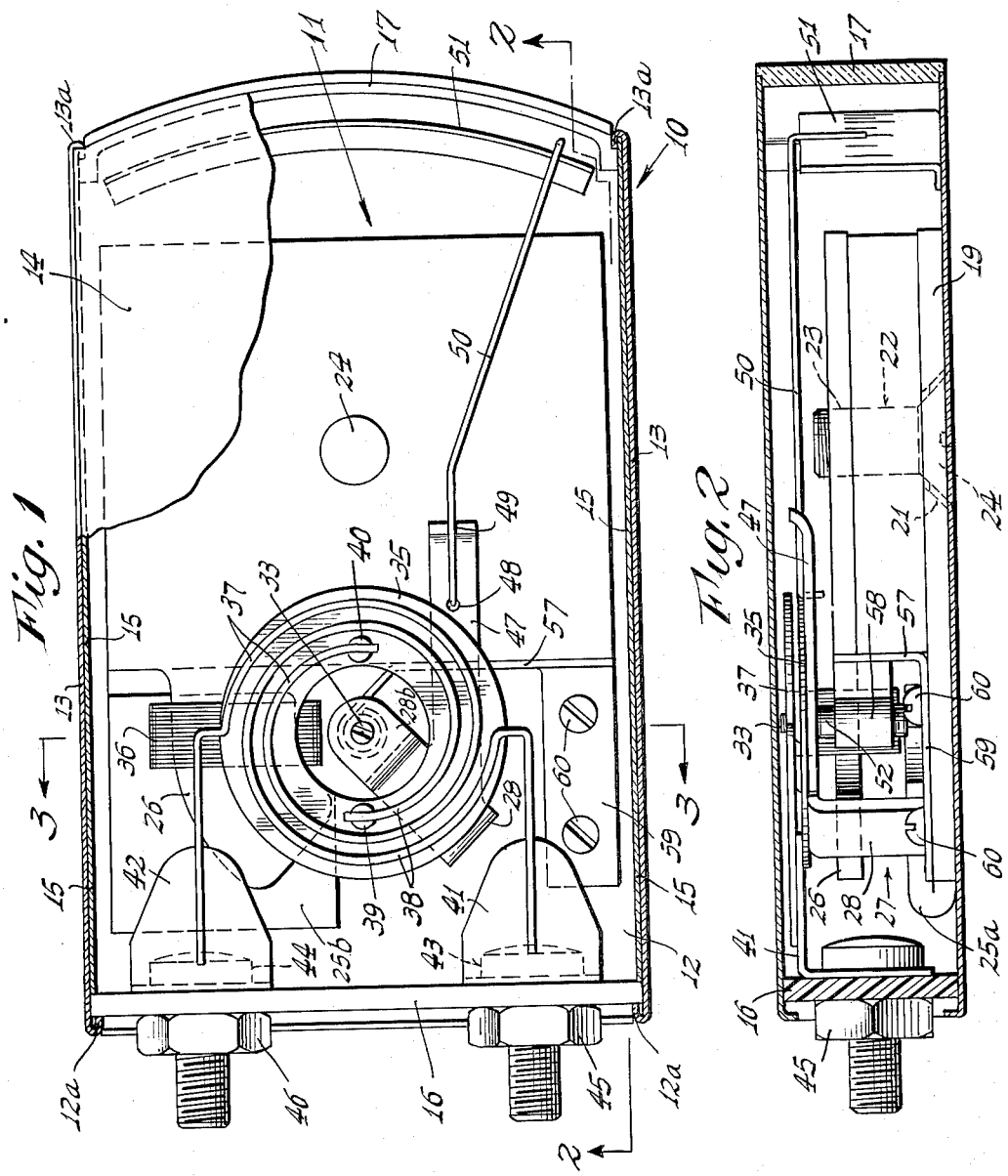
INVENTOR.
Charles G. Roper
BY
Johnson and Kline
ATTORNEYS Aug. 31, 1965
C. G. ROPER
3,204,184
FLAT ECCENTRICALLY PIVOTED COIL TYPE METER
MOVEMENT AND HOUSING THEREFOR
Filed July 6, 1961
2 Sheets-Sheet 2
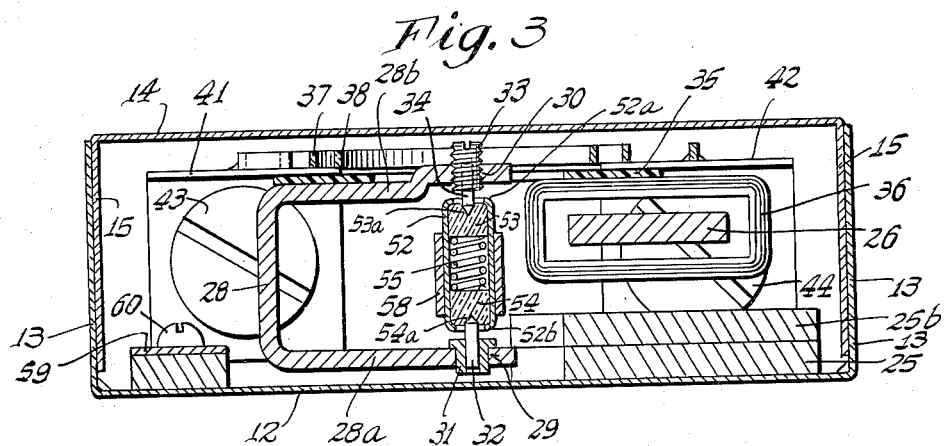
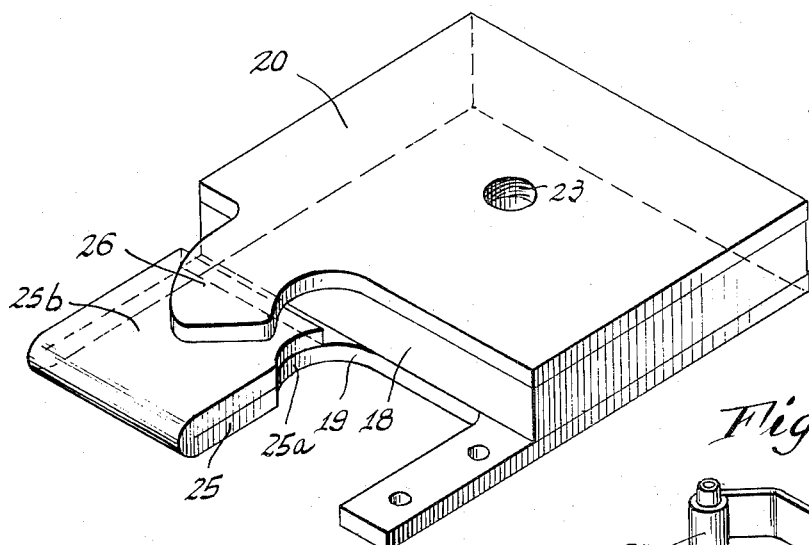
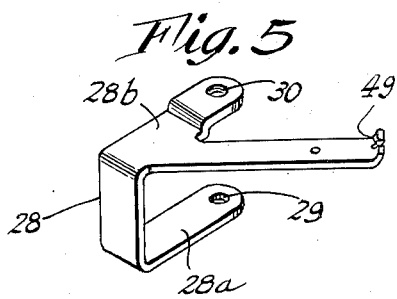
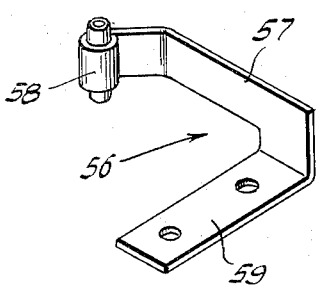
INVENTOR.
Charles G. Roper
BY
Johnson and Kline
ATTORNEYS

United States Patent Office 3,204,184
Patented Aug. 31, 1965

3,204,184
FLAT ECCENTRICALLY PIVOTED COIL TYPE
METER MOVEMENT AND HOUSING THEREFOR
Charles G. Roper, Fairfield, Conn., assignor, by mesne
assignments, to C. Garland Roper, Fairfield, Conn.
Filed July 6, 1961, Ser. No. 122,274
10 Claims. (Cl. 324—150)

The present invention relates to an electric meter device having a meter unit provided with a novel field and armature construction whereby meter devices having small dimensions can be made.

It is an object of the present invention to provide an electric meter for measuring direct currents which is rugged, compact and readily manufactured and assembled.

It is another object of the invention to provide a meter of simple construction which is sensitive and accurate.

A feature of the invention resides in the use of a novel magnetic structure embodying a thin wafer of permanent magnetic material and flat pole pieces, prefereably of soft iron, producing a single path, low reluctance magnetic gap.

A further feature of the invention resides in the formation of a uniform magnetic field through the use of thin wafers of ceramic or nickel alloy materials, which wafers are of relatively large sizes producing an abundance of lines of flux in the gap which permit the use of a large air gap and provide ample clearance for the movable coil of the meter.

A still further feature of the invention resides in a novel armature construction having the movable coil thereon in offset relation with a pivot therefor and in the mounting means for the armature which enables a thin small meter to be produced.

Other features and advantages of the invention will be apparent from the specification and claims when considered in connection with the accompanying drawings in which:

FIGURE 1 is a plan view partly in section of the meter device.

FIG. 2 is a sectional view taken along line 2—2 of FIG. 1.

FIG. 3 is a sectional view taken along line 3—3 of FIG. 1.

FIG. 4 is a perspective view of the magnet unit.

FIG. 5 is a perspective view of the armature frame.

FIG. 6 is a perspective view of the armature mounting bracket.

As shown in the drawings the meter device comprises a casing 10 having a meter unit 11 mounted therein. While the casing may be of various constructions, in the herein illustrated form of the invention it comprises a base section 12 having upstanding walls 13 at the sides thereof and a cover section 14 having depending side walls 15 for sliding into and frictionally engaging the walls of the base section as shown in FIG. 3. The casing section 12 has shoulders 12a cooperating with the ends of the walls 15 to provide means for mounting a terminal block 16 at one end of the casing and a window 17 at the other end of the casing. The shoulders 13a and cooperating edges at the ends of the two casing sections provide the means for retaining the window in place as shown in FIGS. 1 and 2.

The meter unit 11 comprises a novel magnetic structure including a thin, relatively flat wafer 18 of permanent magnetic material. This wafer can be of ceramic or of nickel alloy material. Soft iron pole pieces 19, 20 which are substantially flat and can be formed by stamping or otherwise shaping the material thereof are adapted to be positioned on opposed faces of the magnetic wafer 18 and may be secured thereto in any suitable manner.

In the herein illustrated form of the invention the lower pole piece is provided with a countersunk hole 21, FIG. 2, which is aligned with an aperture 22 substantially in the center of the wafer and the upper pole piece has a threaded bore 23 aligned with the hole to receive a clamping screw 24 passing through and clamping the pole pieces and wafer together. The lower pole piece has an extension 25 at one side thereof projecting beyond the wafer and the upper pole piece has an arcuate extension 26 overlying the extension 25. These extensions form an air gap 27. It will be noted that the edge 25a is curved to conform with the overlying edge of the arcuate extension 26. The extension 26 can extend for as great an arc as is necessary to provide for the required movement of the armature.

This construction permits the use of relatively large magnetic wafers having a high coercive force whereby a uniform magnetic field is produced having an abundance of magnetic lines of flux. The use of parallel pole pieces provides both shielding and a simple means for providing a uniform air gap and uniform magnetic field. If it is desired to reduce the air gap to a desired value, in the present illustrated form of the invention, the lower extension 25 can be provided with a portion 25b which is folded back into overlying relation as clearly shown in FIG. 4.

The armature of the present invention comprises a frame member 28 of generally U-shaped construction having at the ends of the legs 28a, 28b of the U apertures 29, 30 for receiving pivot pins. While the frame can be made of various materials, it is herein illustrated as being formed from sheet bronze. As shown in FIG. 3, the lower aperture 29 has a bushing 31 therein in which pivot pin 32 is secured while the upper aperture 30 is threaded to receive a threaded mounting member 33 for the upper pivot pin 34 to provide aligned pivot pins whereby it can be rotated to adjust the position and bearing pressure of the pivot pin. Carried by the frame in concentric relation with the pivot pin is a disk 35 of Mylar or the like insulating material which is mounted on the frame and secured thereto by suitable adhesive.

The meter has a wound coil 36 of elongate rectangular shape disposed with its longitudinal axis radially to the pivot and secured by suitable adhesive to the undersurface of the insulated disk in a manner that it depends therefrom and passes around the arcuate pole piece 26 as the armature rotates on its pivots, with one of the long sides of the coil being disposed in the air gap.

Calibrating means may be provided for the armature. As herein illustrated this comprises a pair of nested spiral springs 37, 38, preferably formed of Phosphor bronze or the like. These springs are disposed in spaced relation on the top of the disk and are connected thereto to maintain the armature in a predetermined position.

In order to simplify the construction, the springs are used not only as calibrating means but also to provide electrical connections to the wound coil. As herein illustrated, the disk has a pair of terminal tabs 39, 40 secured thereto on opposite sides of the pivot to which the ends of the springs and the leads (not shown) from the coil 36 are secured. The other ends of the springs are fastened to terminal clips 41, 42 mounted on the terminal board by terminal studs 43, 44 which are clamped in positioned by nuts 45, 46 threaded on the terminal studs, with the terminal studs projecting beyond the end of the meter to be connected to the circuit in which the current is to be measured.

From the foregoing it will be seen that the current to be measured will flow through the terminal studs, the terminal clips, the springs and the coil 36 so that the current in the coil will produce a magnetic field which will react with the magnetic field in the air gap and move the armature from its normal position as determined by the action of the spiral springs and in accordance with the energization of the coil.

In order to indicate the amount of movement of the armature, indicator means is provided. As shown in FIGS. 1 and 5, the frame has an arm 47 formed integral with leg 28b and extending at an angle thereto. It is provided with an aperture 48 and a kerf 49 at the end of the arm into which one end of the pointer wire 50 is secured. The pointer has a depending portion at the outer end which moves over an arcuate scale 51 carried by the bottom casing and disposed behind the transparent window 17 so as to give an indication of the deflection of the armature of the meter unit in response to the energization of the coil. The pointer wire is of such a character that it can be bent in order to adjust the meter to a null position, although other usual types of vernier adjustments may be used.

To facilitate mounting of the armature so that it pivots at the center of the curvature of the arcuate pole piece, a novel bearing means is provided for holding the amature in this position. As shown in FIG. 3, the bearing means comprises a sleeve 52 having a pair of jewels 53, 54 or the like bearings mounted therein and normally urged into engagement with end flanges 52a, 52b on the sleeve by a spring 55. Each of the jewels is provided with a center depression 53a, 54a into which the pivots 32, 34 project for pivotally mounting the armature in position.

As shown in FIGS. 2 and 6, the sleeve is held in position on the pivotal axis by a bracket 56 having a projecting arm 57 formed with a curled end 58 which is adapted to extend around and grip the bearing sleeve and secure the bearing sleeve thereto. The bracket 56 is provided with a mounting portion 59 which is adapted to be secured by screws 60 to a portion of the bottom pole piece.

This construction provides for a compact mounting of the armature and lends itself well to the formation of compact meters.

From the foregoing it will be seen that the magnetic structure of the present invention is not only simple to make and easy to assemble, but enables a large flat permanent magnet to be used which not only makes it feasible for making thin and small miniature meters, but also provides a uniform air gap having a large number of lines of flux therein for cooperating with the movable coil which is carried by the armature in offset relation to the axis and which is mounted by a simple, yet effective mounting means. Both the armature and the mounting means therefor can be readily produced as sub-assemblies for cooperating with the magnetic structure for producing the thin miniature meters. The sub-assemblies can be quickly and easily assembled to form the meter unit which can be disposed in a simple, yet effective meter casing to provide a rugged, dependable and accurate meter. The design is flexible and can be readily adapted to provide the required variation in air gap and by properly extending the arcuate extension of the pole pieces, greater movements can be imparted to the indicator needle for establishing larger scales of movement as might be required.

Further, the superposed projections of the pole pieces provide adequate shielding and a uniform air gap and uniform flux therein.

While the foregoing structure of the present invention has been illustrated and described as providing a meter means for indicating on a scale the deflection of the armature in response to the D.C. energization thereof, it is to be understood that it can be used as a relay or limit switch in which the pointer and cooperating scale may be replaced by any switching means for energizing a circuit in response to predetermined deflections of the armature.

Variations and modifications may be made within the scope of the claims and portions of the improvements may be used without others.

I claim:

1. A meter unit comprising a wafer of permanent magnet material having pole pieces secured thereto and projecting therefrom, the projecting part of at least one of the pole pieces having an arcuate portion, an armature having opposed pivots and a wound coil thereon, mounting means pivotally mounting the armature with the coil surrounding said arcuate portion and portions of said coil passing through the magnetic field between the pole pieces, said mounting means comprising a sleeve having shoulders at the ends thereof, bearings slidable in said sleeeve and having bearing portions for engaging said pivots, a spring between the bearings urging the bearings toward said shoulders, and a bracket having a curled end embracing the sleeve for supporting the sleeve between said pivots and at the center for said arcuate portion and supporting the coil for bodily orbital movement around said sleeve, means normally urging the armature to a predetermined position, means electrically connected to said coil to cause said armature to move in accordance with the current supplied to the coil, and means operable in response to the amount of movement of the coil.

2. A meter unit comprising a thin wafer of permanent magnet material, a pair of soft iron stampings forming planar pole pieces, means securing the pole pieces to opposite faces of the wafer to extend thereover with portions of said pole pieces projecting therefrom in parallel relation to form a single air gap having a magnetic field therein, the projecting part of at least one of the pole pieces having an arcuate portion, an armature having a wound coil thereon, means pivotally mounting the armature on an axis perpendicular to the plane of the wafer with the coil surrounding said arcuate portion and a portion only of said coil passing through the magnetic field between the pole pieces, said means comprising a bracket mounted on and having portions located between said projecting parallel pole pieces and having an arm carrying an armature supporting bearing with the bearing located on said axis, means normally urging the armature to a predetermined position, means electrically connected to said coil to cause said armature to move in accordance with the current supplied to the coil, and means operable in response to the amount of movement of the coil.

3. A thin, flat meter unit comprising a thin wafer of permanent magnet material having flat pole pieces secured to opposite faces thereof with parts projecting therefrom, the projecting part of at least one of the pole pieces having an arcuate portion, an armature comprising a frame formed of a substantially U-shaped stamping having opposed pivots in the legs of the U, a thin, flat insulating disk secured to one leg of the U, a wound elongate coil secured to the disk to be on a radial line passing through the pivots, a bearing sleeve having jewels yieldably mounted therein to receive the opposed pivots, means supporting the bearing sleeve betwen said legs for pivotally mounting the armature, means normally urging the armature to a predetermined position, said coil surrounding said arcuate portion with portions of said coil passing through the magnetic field between the pole pieces and when energized causing movement of the armature, and means indicating the amount of movement of the coil.

4. A meter unit comprising a thin wafer of permanent magnet material having flat pole pieces of soft iron secured to opposite faces thereof and projecting therefrom to form an air gap providing a magnetic field, the projecting part of at least one of the pole pieces having an arcuate coil-receiving portion, an armature comprising a frame formed of a substantially U-shaped member having opposed pivots in the legs of the U, an insulating disk secured to one leg of the U, a wound elongate coil secured to the disk and located on a radial line passing through the pivots with said coil surrounding said arcuate portion and portions of said coil passing through the magnetic field between the pole pieces, bearing means for receiving the pivots for mounting the armature for pivotal movement, a pair of nested spiral springs carried by the disk and normally urging the armature to a predetermined position, each having one end electrically connected to the coil, the other end of said springs being electrically connected to terminals for the meter whereby the coil can be energized, and means indicating the amount of movement of the coil.

5. A meter comprising a housing and a unit mounted therein, said housing comprising a base portion and a nested cover portion, an insulated terminal base mounted at one end of the housing and held in position by cooperating pottions of the base and cover portion, said unit being connected to said terminal base and including a flat magnetic field structure having planar pole pieces having projecting portions providing an air gap, with one of said portions being arcuate and an armature having a wound coil thereon, said armature being mounted by pivot means including bearing means disposed in the plane of movement of the armature carried by a bracket disposed between the projecting pole pieces so as to pivot about an axis at the center for the arcuate portion with the coil offset from and radial to said axis to bodily orbit the bearing means with the coil surrounding said arcuate portion, said coil when energized causing said armature to move in accordance with the current supplied to the coil, a window mounted at the other end of the housing to extend across the end thereof, said window having transverse top and bottom shoulders extending thereacross to engage the ends of the base and cover to seal the housing and prevent inward movement of the window and having portions at the ends cooperating with inward projections on the side walls of the housing for preventing outward movement of the window, and means connected to the armature and cooperating with a scale mounted at the other end of the housing adjacent the window for indicating the amount of movement of the coil in response to current supplied to said terminals.

6. A meter unit comprising a wafer of permanent magnet material having planar pole pieces secured thereto and projecting therefrom to provide an air gap therebetween having a magnetic field, the projecting part of at least one of the pole pieces having an arcuate portion, an armature having opposed pivots and a member adjacent one of said pivots extending transversely of an axis passing through said pivots, a wound coil mounted on said transverse member to depend therefrom in offset spaced relation with said axis and to be in a radial line passing through said axis, bearing means disposed on the axis between said pivots pivotally mounting the armature with the coil surrounding said arcuate portion and portions of said coil passing through the magnetic field between the pole pieces, said bearing means being supported by a bracket carried by and located between said pole pieces and being disposed inside of the path of movement of said coil so that said coil orbits bodily about said bearing means, spring means normally urging the armature to a predetermined position, said spring means being electrically connected to said coil and to terminals for the meter to cause said armature to move in accordance with the current supplied to the coil, and means operable in response to the amount of movement of the coil.

7. A housing having a meter therein provided with a scale and cooperating pointer and having an opening at one end through which the scale may be viewed, said housing comprising a base portion having a bottom and upstanding side walls on each side of said opening and a cover portion having a top and depending side walls on each side of said opening and when asssembled adapted to be telescoped with said side walls on the base portion so that the walls of one portion lie within and are in substantial engagement with the walls of the other portion, the side walls on one of said portions adjacent the opening having internal shoulders facing away from said opening, a transparent window disposed in said opening and having side shoulders engaging the internal shoulders to prevent the window from moving outwardly through the opening and having projecting transverse portions on the top and bottom thereof cooperating with the edges of the top and bottom of the cover and base portions to prevent the window from moving inwardly through the opening whereby the window is readily located and secured in the opening in said housing incident to the assembly of the base and cover portions of the housing.

8. A thin compact meter unit comprising a thin wafer of permanent magnet material having planar pole pieces secured on opposite faces and projecting therefrom to provide an air gap having a magnetic field therein, the projecting part of at least one of the pole pieces having an arcuate portion, a U-shaped armature having opposed inwardly facing pivots in the legs thereof and having a wound coil mounted thereon to lie to one side of and spaced from an axis passing through said pivots with the coil surrounding and movable over said arcuate portion with one side of the coil passing through the magnetic field between the projecting parts of said pole pieces, means for pivotally mounting said armature comprising bearing means disposed between said pivots and having bearing portions for engaging said pivots, and fixed bracket means disposed between said projections of the pole pieces and having an arm extending between the legs of the U-shaped armature provided with means at the end thereof engaging and mounting said bearing means at the center of curvature of said arcuate portion, and said coil moving bodily in an orbit about said bearing means, means normally urging the armature to a predetermined position. Means electrically connected to said coil to cause said armature to move in accordance with the current supplied to the coil, and means operable in response to the amount of movement of the coil.

9. A thin compact meter unit comprising a thin wafer of permanent magnet material having planar pole pieces secured on opposite faces and projecting therefrom to form an air gap therebetween having a magnetic field therein, the projecting part of at least one of the pole pieces having an arcuate portion, a U-shaped armature having opposed inwardly facing pivots in the legs thereof and having an elongate wound coil mounted thereon to lie to one side of and space from an axis passing through said pivots with the coil surrounding and movable over said arcuate portion with only one side of the coil passing through the magnetic field in said air gap between the projecting parts of said pole pieces, means for pivotally mounting said armature comprising bearing means disposed between said pivots and having bearings for engaging said pivots, and a bracket disposed between said projecting pole pieces and secured to one of said projecting pole pieces adjacent the end of said wafer, said bracket having a projecting arm extending transversely adjacent the end of the wafer and having a portion of the arm extending outwardly between the legs of the U-shaped armature and having means at the end thereof engaging and mounting the bearing means at the center of curvature of said arcuate portion, and said coil moving bodily in an orbit about said bearing means, means normally urging the armature to a predetermined position, means electrically connected to said coil to cause said armature to move in accordance with the current supplied to the coil, and means operable in response to the amount of movement of the coil.

10. A thin compact meter unit comprising a thin wafer of permanent magnet material having planar pole pieces secured on opposite faces and projecting therefrom to provide an air gap having a magnetic field therein, the projecting part of at least one of the pole pieces having an arcuate portion, a U-shaped armature having opposed inwardly facing pivots in the legs thereof and having an elongate wound coil having two long sides connected by short end portions mounted thereon to lie to one side of and spaced from an axis passing through said pivots with the coil surrounding and movable over said arcuate portion with only one long side of the coil passing through the magnetic field between the projecting parts of said pole pieces, means for pivotally mounting said armature comprising a sleeve of a length to be disposed between said pivots and having shoulders at the ends thereof, bearings slidable in said sleeve and having bearing portion for engaging said pivots, a spring between the bearings urging the bearings toward said shoulders, and fixed bracket means having a projecting arm extending between the legs of the U-shaped armature and having means at the end thereof engaging and mounting the sleeve between said pivots and at the center of curvature of said arcuate portion, and said coil moving bodily in an orbit about said sleeve, means normally urging the armature to a predetermined position, means electrically connected to said coil to cause said armature to move in accordance with the current supplied to the coil, and means operable in response to the amount of the movement of the coil.

References Cited by the Examiner

UNITED STATES PATENTS

| | | | |
|---|---|---|---|
| Re.23,236 | 5/50 | Knudsen | 324—150 |
| 529,435 | 11/94 | Weston | 324—151 |
| 627,908 | 6/99 | Davis et al. | 324—150 |
| 2,355,649 | 8/44 | Hickok | 324—155 |
| 2,379,861 | 7/45 | Browne et al. | 220—82 |
| 2,382,728 | 8/45 | Kupchick | 220—82 |
| 2,773,239 | 12/56 | Parker | 324—150 |
| 2,871,450 | 1/59 | Podoloff | 324—156 |

FOREIGN PATENTS

| | | |
|---|---|---|
| 912,602 | 5/54 | Germany. |
| 441,908 | 1/36 | Great Britain. |

WALTER L. CARLSON, *Primary Examiner.*

BENNETT G. MILLER, *Examiner.*

UNITED STATES PATENT OFFICE
CERTIFICATE OF CORRECTION

Patent No. 3,204,184                                                August 31, 1965

Charles G. Roper

It is hereby certified that error appears in the above numbered patent requiring correction and that the said Letters Patent should read as corrected below.

Column 2, line 64, for "positioned" read -- position --; column 3, line 4, for "amout" read -- amount --; line 52, for "cooperating" read -- cooperation --; column 5, line 14, for "pottions" read -- portions --; column 6, line 33, for "position. Means" read -- position, means --; line 45, for "space" read -- spaced --; column 7, line 8, for "portion" read -- portions --; line 20, strike out "the", second occurrence.

Signed and sealed this 22nd day of March 1966.

(SEAL)
Attest:

ERNEST W. SWIDER
Attesting Officer

EDWARD J. BRENNER
Commissioner of Patents